US006914746B1

(12) United States Patent
Meyer (10) Patent No.: US 6,914,746 B1
(45) Date of Patent: Jul. 5, 2005

(54) HIGH SUSTAINED DATA RATE STORAGE DEVICES HAVING MICROACTUATOR

(76) Inventor: Dallas W. Meyer, 130 Alta Vista Way, Danville, CA (US) 94526

( * ) Notice: Subject to any disclaimer, the term of this patent is extended or adjusted under 35 U.S.C. 154(b) by 165 days.

(21) Appl. No.: 10/342,615

(22) Filed: Jan. 13, 2003

Related U.S. Application Data
(60) Provisional application No. 60/431,554, filed on Dec. 5, 2002.

(51) Int. Cl.$^7$ .............................................. G11B 5/596
(52) U.S. Cl. .................................................... 360/78.12
(58) Field of Search ............................... 360/78.12, 69, 360/75, 77.04, 78.05, 78.07, 78.09, 97.01, 294.4, 264.5

(56) References Cited

U.S. PATENT DOCUMENTS

| | | | | | |
|---|---|---|---|---|---|
| 5,060,210 | A | * | 10/1991 | Fennema et al. | 369/30.15 |
| 5,521,778 | A | * | 5/1996 | Boutaghou et al. | 360/264.5 |
| 6,078,468 | A | * | 6/2000 | Fiske | 360/97.01 |
| 6,101,058 | A | * | 8/2000 | Morris | 360/69 |
| 6,262,868 | B1 | * | 7/2001 | Arya et al. | 360/290 |
| 6,414,827 | B1 | * | 7/2002 | Young et al. | 360/78.09 |
| 6,421,211 | B1 | * | 7/2002 | Hawwa et al. | 360/294.4 |
| 6,452,755 | B2 | | 9/2002 | Bonin | |
| 6,469,859 | B1 | | 10/2002 | Chainer et al. | 360/75 |

(Continued)

OTHER PUBLICATIONS

Co-pending U.S. Appl. No. 10/342,920, to Dallas W. Meyer, filed Jan. 13, 2003 (54 pages), and 17 sheets of accompanying drawings. Note: In an Office Action mailed in this case on Jun. 14, 2004, claims 1, 4, 12, 13, 24, and 31 were rejected under 35 U.S.C. § 102(e) by U.S. Appl. No. 6,600,634 to Kim, et al., claims 1–3, 7, 10, 12, 13, 16, 17, 24, 25, 29, 31–33, and 35–38 were rejected under 35 U.S.C. § 102(e) by U.S. Appl. No. 6,611,399 to Mei, et al, and claims 14, 15 were rejected under 35 U.S.C. § 103(a) by Mei.

(Continued)

Primary Examiner—David Hudspeth
Assistant Examiner—Fred F. Tzeng
(74) Attorney, Agent, or Firm—Workman Nydegger (57) ABSTRACT

Multiple recording heads are used to perform parallel read and write operations on multiple disk surfaces in disk drives. Small-scale actuators are positioned between the transducer and the macroactuator that moves the entire head gimble assembly. The small-scale actuators adjust the position of the recording heads to the appropriate data tracks during the read and write operations to compensate for misalignments between the multiple recording heads. The parallel read and write operations can significantly improve the sustained data rates associated with disk drives. The access time required to read data stored on a disk can be reduced by writing multiple copies of the same data blocks to different locations on the surface of disks in the disk drives. Read operations are performed by moving the recording head to the copy of the data block that will produce the smallest access time.

45 Claims, 7 Drawing Sheets

U.S. PATENT DOCUMENTS

| | | | |
|---|---|---|---|
| 6,490,118 B1 * | 12/2002 | Ell et al. | 360/77.04 |
| 6,493,177 B1 * | 12/2002 | Ell et al. | 360/78.05 |
| 6,501,623 B1 | 12/2002 | Sassolini et al. | |
| 6,535,360 B1 | 3/2003 | Kim et al. | |
| 6,542,281 B2 | 4/2003 | Feldman et al. | |
| 6,545,970 B2 | 4/2003 | Durnin et al. | |
| 6,547,975 B1 | 4/2003 | Kobrin | |
| 6,556,380 B2 | 4/2003 | Bunch et al. | |
| 6,563,665 B1 * | 5/2003 | Ell | 360/78.05 |
| 6,594,119 B1 | 7/2003 | Koshikawa et al. | 360/294.3 |
| 6,600,619 B1 * | 7/2003 | Morris et al. | 360/75 |
| 6,600,634 B1 | 7/2003 | Kim et al. | 360/294.5 |
| 6,611,399 B1 | 8/2003 | Mei et al. | 360/234.7 |
| 6,633,451 B1 | 10/2003 | Chainer et al. | 360/75 |
| 6,747,836 B2 * | 6/2004 | Stevens et al. | 360/78.05 |
| 6,768,610 B1 * | 7/2004 | Morris et al. | 360/78.07 |
| 2003/0093894 A1 | 5/2003 | Dugas et al. | 29/603.15 |
| 2003/0161061 A1 | 8/2003 | Lamberts | 360/31 |
| 2003/0197969 A1 | 10/2003 | Szita et al. | 360/77.08 |

OTHER PUBLICATIONS

Co-pending U.S. Appl. No. 10/775,406, to Dallas W. Meyer, filed Feb. 9, 2004.

Co-pending U.S. Appl. No. 10/728,561, to Dallas W. Meyer, filed Dec. 5, 2003.

Co-pending U.S. Appl. No. 10/794,482, to Dallas W. Meyer, filed Mar. 5, 2004.

Co-pending U.S. Appl. No. 10/818,641, to Dallas W. Meyer, filed Apr. 5, 2004.

Co-pending U.S. Appl. No. 10/900,713, to Dallas W. Meyer, filed Jul. 27, 2004.

* cited by examiner

HIGH SUSTAINED DATA RATE STORAGE DEVICES HAVING MICROACTUATOR

RELATED APPLICATIONS

This application claims the benefit of U.S. Provisional Patent Application Ser. No. 60/431,554, filed Dec. 5, 2002, entitled "High Sustained Data-Rate Disc-Drives, or Future High Data-Rate Network Storage Device (NESD)," which is incorporated herein by reference.

BACKGROUND OF THE INVENTION

1. The Field of the Invention

The present invention relates to disk drives by which data can be written to or read from magnetic storage media. More specifically, the present invention relates to disk drives having multiple recording heads that are capable of performing parallel read and write operations, which increases the read and write data rates.

2. The Relevant Technology

During recent years, there has been a steady improvement in the volume of data that can be stored on magnetic storage media, such as hard disks drives used in computers. As the areal density of the storage media associated with disk drives has increased, storage capacity per unit cost has fallen dramatically, which has enabled individual users and enterprises to radically change the way in which data is recorded and stored. Indeed, the ability to store large volumes of data inexpensively has been a driving factor in the information technology revolution during recent decades.

Figure 1:
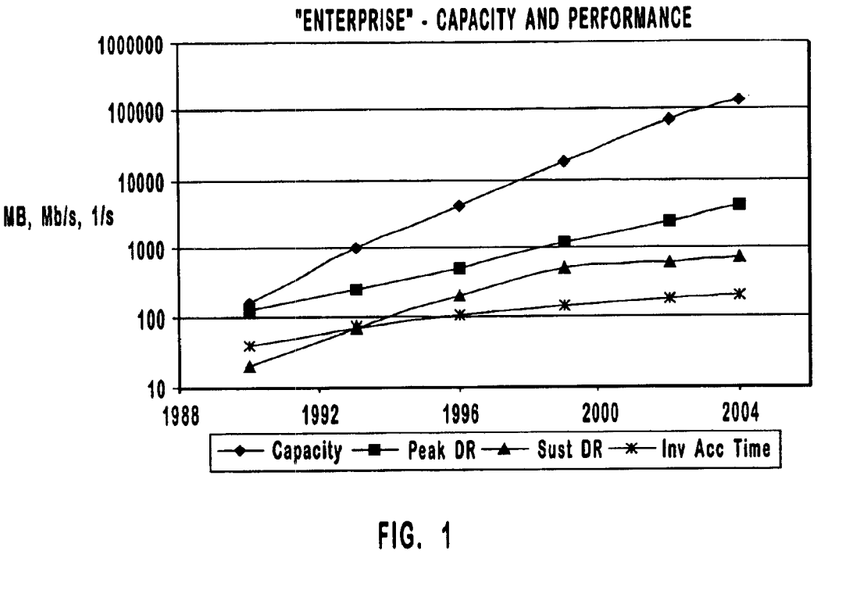
FIG. 1 is a graph that shows recent improvements in capacity, peak data rate, sustained data rate, and access times for high performance disk drives.

One of the key issues plaguing the drive industry over the past several years is that the growth in areal density of the magnetic storage media has not been matched by a corresponding growth in sustained data rate. During recent years, the areal density growth has been about 100% per year, whereas the sustained data rate associated with disk drives has grown at only about 30% per year. This is illustrated in FIG. 1, which graphs the storage capacity, the peak data rate, the sustained data rate, and the inverse of the access time for high-performance disk drives in recent years, as well as projections for the coming years that have been made by experts in the industry in view of the expectation of incremental advancements based on current technology. Storage capacity is generally expressed in terms of bytes of data that can be stored per unit area of disk. The peak data rate is the maximum data rate is expressed in terms of bits per unit time. The peak data rate typically relates to the peak write data rate that can be reached for a short period of time, and is generally achieved using buffering as described below. The sustained data rate is measured in bits per unit time and is defined as either the write or read data rate that can be achieved for write or read operations having an arbitrarily long duration. The access time is defined as the time between the receipt of a read request and the time at which the requested data is under the recording head.

Figure 2:
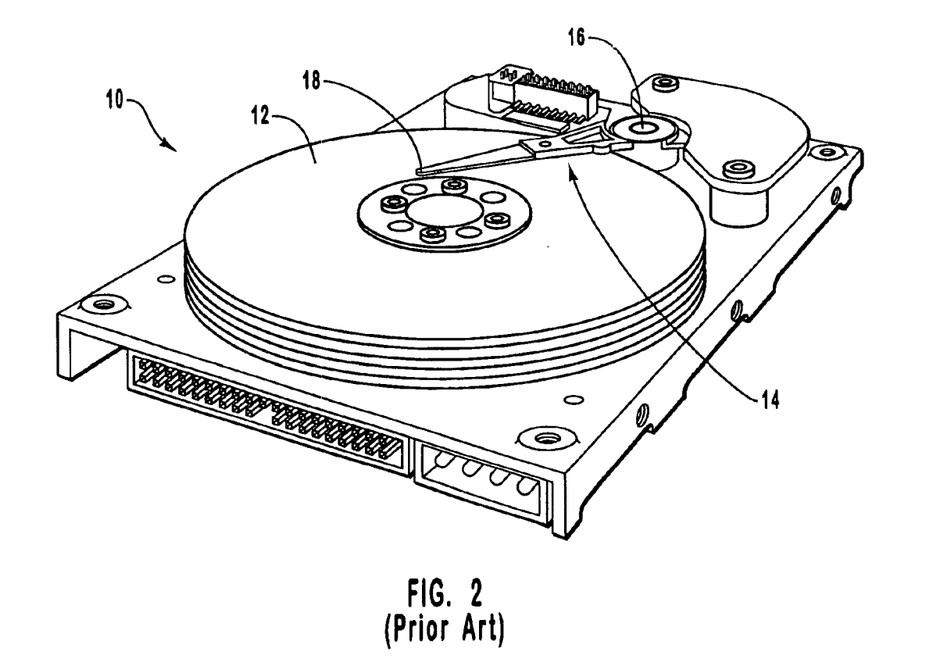
FIG. 2 is a perspective view of a conventional disk drive with a magnetic storage medium and a single recording head.

FIG. 2 illustrates a conventional hard disk drive 10, which includes a single disk 12 and a single head gimble assembly 14 with a macroactuator 16 and a slider, or recording head 18. In operation, a transducer positioned on the recording head 18 reads data that is magnetically encoded on the surface of the disk 12 or writes data to the surface of the disk. In order to access the appropriate sectors on the disk, the macroactuator 16 uses a closed-loop feedback or servo process to detect the position of the recording head 18 and adjust the position as needed. Other conventional disk drives have multiple recording heads and can include multiple disks in a disk stack. However, existing hard disk drives write and read data using one recording head at a time, on various surfaces within the disk stack, rather than using multiple recording heads simultaneously, due to several physical limitations. The inability to use more than one recording head 18 at a time is a factor that has significantly limited improvements in the data rates of disk drives, as shown in FIG. 1.

The maximum sustained data rate is limited by the linear bit density that can be sustained on a disk 12 and the disk rotational velocity. For disk drives that operate at 15,000 rpm, which is the highest speed currently available, and that have an inner disk diameter of about 3.3 inches and a linear density of 500 kilobits/inch, the maximum sustained data rate can be no greater than about 1 Gb/s. In addition, eddy currents in the soft magnetic material used in the recording head 18 limit switching speeds so that data rates are typically no greater than 500 Mb/s. Other physical limitations to reading and writing at data rates of over about 500 Mb/s include thermal stability of media with very short bit lengths and reduced sense amplitude due to decreased shield-shield gap spacings on giant magnetoresistive (GMR) heads. It is expected that areal density will continue to improve during the coming years. However, it is likely that a large percentage of the gains to be made in areal density in the next few years will relate to increased track density, which would make the data rate problems even worse.

Because of the relatively small increase in the maximum available sustained data rate in individual disk drives, systems using redundant arrays of independent disks (RAIDs) have become widely used for enterprise data storage. Such RAID systems involve parallel formatting and use of existing high capacity disk drives, which allow the overall data rate for RAID systems to be significantly higher than rates for individual disk drives.

The striping and caching techniques that are used to sequence the timing of separate, multiple disk drives in a RAID that is capable of operating at data rates of five to ten times that of individual disk drives are quite complex. RAID systems operate at various levels, which relate to the degree to which the data is distributed and mirrored to the multiple disk drives in the system. One basic principle associated with RAIDs is that the operation of multiple, distinct disk drives in the array must be coordinated. Unfortunately, because of the complexity and large number of disk drives required in RAID systems, such technology has been adopted only by high-end enterprise servers. Because of cost and complexity considerations, data storage systems used by mid-range and small enterprises are typically limited to single or a double-backup configuration, running at standard data rates that are less than 500 Mb/s.

Peak data rates are often referred to in the drive and drive interface literature as a performance metric, including Ultra-320 SCSI, double rate Fibre Channel, etc. These data rates extend up to 2.5 Gb/s, and are achieved by buffering the I/O to the drive. In other words, the buffers enable the data rate to be temporarily higher between the buffer and the computer or other information device that accesses the disk drive than the maximum sustained data rate that can be achieved by the disk drive. Thus, from the standpoint of the computer or other information device that accesses the disk drive, the apparent peak data rate is greater than the actual data rate associated with the disk drive. The use of buffers is most effective at enhancing write data rates, since data that is written to a disk can be easily cached. Buffering is much less effective for reading, as the data to be read is not often in the buffer, and must be found and read using normal accessing techniques, which have normal seek and latency times.

The relatively small increases during recent years in the maximum sustained data rate for disk drives represents a significant limiting factor in the speed at which computers can operate when performing I/O operations that use disk drives. Moreover, because of the complexity and cost of RAID systems, this problem is more pronounced for users of individual personal computers and networks associated with small and medium sized enterprises.

SUMMARY OF THE INVENTION

The present invention relates to disk drives having multiple recording heads that can be used simultaneously for parallel read and write operations. The disk drives use a small-scale actuator, or microactuator, that is positioned between the transducer and the macroactuator that is used to move the entire head gimble assembly. The microactuator is capable of positioning the transducer of the recording head on the scale of a few data tracks, which enables multiple recording heads to be simultaneously positioned over corresponding data tracks of different surfaces of disks, even though the recording heads may be out of alignment due to any of several mechanical factors.

During a write operation, a single data block is divided into a set of related data blocks. Conventional disk drives would write the single data block to one or more sectors on a single surface of a disk using a single recording head. In contrast, according to the invention, the related data blocks are written simultaneously by the multiple recording heads that have been positioned over segments of corresponding data tracks in a cylinder that spans multiple disks in the disk stack. The read operation is essentially the inverse of the write operation, and involves reading the set of related data blocks simultaneously using the multiple recording heads.

Performing multiple parallel read or write operations can significantly increase the sustained data rate associated with disk drives. As noted above, conventional disk stacks operate using only one recording head at a time, and use the macroactuator to perform a repositioning operation as the disk drive switches from one recording head to another to compensate for the unavoidable misalignment between recording heads. In contrast, the disk drives of the invention use the multiple recording heads simultaneously, achieving an improvement in sustained data rate that is essentially a multiple of the sustained data rate that can be obtained using a single recording head. The resulting gains in the data rate are particularly significant for read operations that generally do not benefit from the caching techniques that have been used in existing systems.

The parallel read and write operations can be used to construct a disk drive that has sustained data rates that are comparable to current high-speed data networks, such as optical networks. According to one aspect of the invention, an optical transceiver is integrated into a disk drive having multiple recording heads that can be used simultaneously. The integration of the optical transceiver yields a modular disk drive that can be conveniently used to perform I/O operations in optical data networks.

According to another aspect of the invention, the access time required to read data written on a disk drive is reduced by writing multiple copies of the same data blocks at multiple locations in a disk drive. The access time to perform a read operation after the request is made includes the seek time necessary to move the recording head radially to the appropriate data track and the rotation time that transpires as the start point of the sector that contains the data block rotates to the recording head. According to the invention, two or three copies, for example, of a single data block are written to different locations on the surface of a disk. When a read request is received, the recording head is moved to the copy of the data block that produces the smallest access time. The write data rate is reduced somewhat because multiple copies of the data blocks are written to the disk. However, this is not a critical concern, since the sustained write data rate can be increased using parallel recording heads and the peak write data rate can be increased using buffering of the write data.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

The present invention is directed to disk drives and associated systems that are capable of reading and writing using multiple recording heads simultaneously. The disk drives of the invention can include an arbitrary number of disks in a stack. Each disk can have a single recording head on a single side of the disk or can have dual recording heads, with one head on each side of the disk. A small-scale actuator is positioned between the transducer and the coarse actuator, or macroactuator, that moves the entire head gimble assembly. The small-scale actuator adjusts the position of the transducers on each recording head with respect to the data tracks on the corresponding disk. Consequently, the transducers on the multiple recording heads can be reliably positioned simultaneously over the data tracks in a cylinder that spans multiple disks, which permits parallel read or write operations to be performed using multiple recording heads.

Because the disk drives of the invention can performing parallel read or write operations, the sustained data rate is roughly n times greater than the sustained data rate associated with the individual recording heads, where n is the number of recording heads in the disk drive. The invention also relates to disk drives and corresponding methods in which multiple copies of data blocks are written by a recording head to the associated disk. Storing multiple copies of data blocks on a disk reduces the average access times required for physically moving the components of the disk drive in order to respond to a read request. The technique of using multiple copies of data blocks can be combined with the parallel read and write operations to increase sustained data rates as well as reduce access times. The read and write operations are referred to collectively herein as being "input/output (I/O) operations."

1. Macroactuators and Microactuators

In order to understand the parallel read and write operations of the invention, it is useful to describe another approach that could be used to attempt to perform simultaneous read or write operations using multiple recording heads. In contrast to the recording heads that are controlled according to the invention using small-scale actuators in addition to the macroactuators that move the entire head gimble assembly, the disk drive 20 illustrated in FIG. 3 includes a slider 22a and a slider 22b that are controlled using only a macroactuator 24. Slider 22a and slider 22b are attached to arms 26a and 26b, respectively, that are rotated by the coarse actuator, or macroactuator 24 about an axis of rotation 28. As is described below, sliders 22a and 22b of FIG. 3 cannot be reliably and repeatedly positioned over identifiable and selected data tracks (e.g., data tracks 30a and 30b) in a way that would permit parallel read or write operations to be performed.

A physical limitation of the past has been due to the need to close-loop servo from error signals taken from the surfaces of the disks in a disk drive. In particular, embedded servo wedges, which define the position of the data tracks on the surface of a disk, are written to the surface of the disk when a disk drive, such as disk drive 20, is initially formatted. Until the early 1990s, disk drives having a disk stack would typically dedicate an entire disk surface to servo information, with all other surfaces containing only data. Because track pitches were relatively wide at the time, a set of recording heads could be accurately controlled together using the servo information that was written to only one of the surfaces in the disk stack. However, as track pitches became more narrow, this method could no longer be effectively used, since it was no longer possible to control the position of one recording head using servo information detected on another surface by another recording head. Thus, dedicated servo surfaces have now been replaced with embedded servo on all disks.

Figure 3:
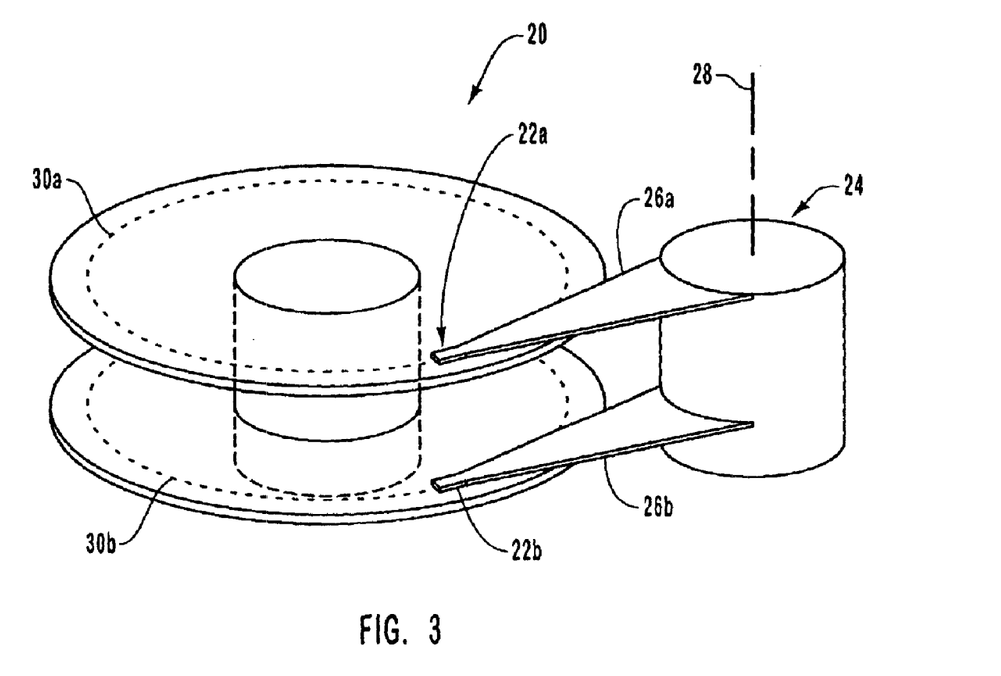
FIG. 3 illustrates a dual disk, dual head data storage device.

Several factors, including random vibrations, disk flutter, thermal distortions, non-repeatable disk runout and bearing frequencies, prevent recording heads 22a and 22b from remaining in alignment with one another after the embedded servo writing operation is performed. Thus, if an attempt were made to perform a parallel read or write operation using recording heads 22a and 22b after the servo writing process, it is likely that the sliders would be out of alignment and could not be simultaneously positioned over data tracks in a single cylinder that spans multiple disks. For this reason, disk drives having multiple recording heads controlled using only a macroactuator are incapable of parallel read or write operations. Instead, the recording heads can be used only in sequence. For example, recording head 22b can be used to read or write data from a selected data track 30b only by repositioning recording head 22b over the data track after recording head 22a has been used.

In contrast, the disk drives of the invention use small-scale actuators in addition to a single macroactuator to control the position of the recording heads simultaneously over selected data tracks, which enables parallel read and write operations to be performed, as will be described in greater detail below. Another solution that can be used to perform parallel read and write operations is a disk drive that has multiple distinct macroactuators and head gimble assemblies, each being dedicated to a different recording head. However, macroactuators are relatively expensive, and the inclusion of multiple macroactuators is generally not cost-effective compared to the use of small-scale actuators.

Figure 4A:
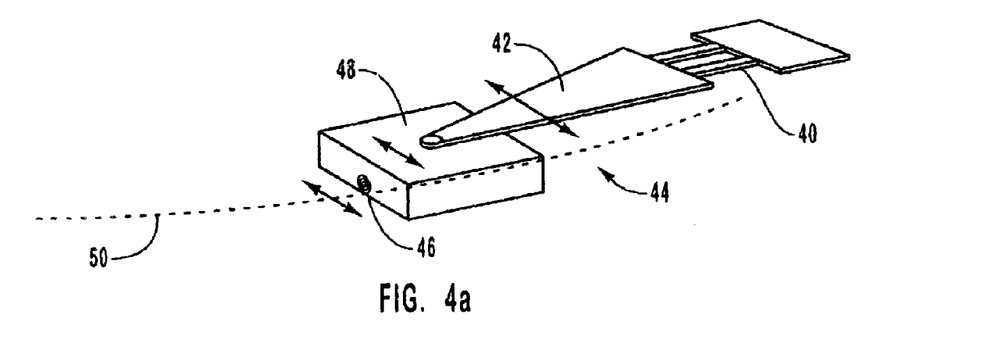
FIG. 4a illustrates a small-scale actuator that is integrated into an arm of a head gimble assembly in a disk drive.
Figure 4B:
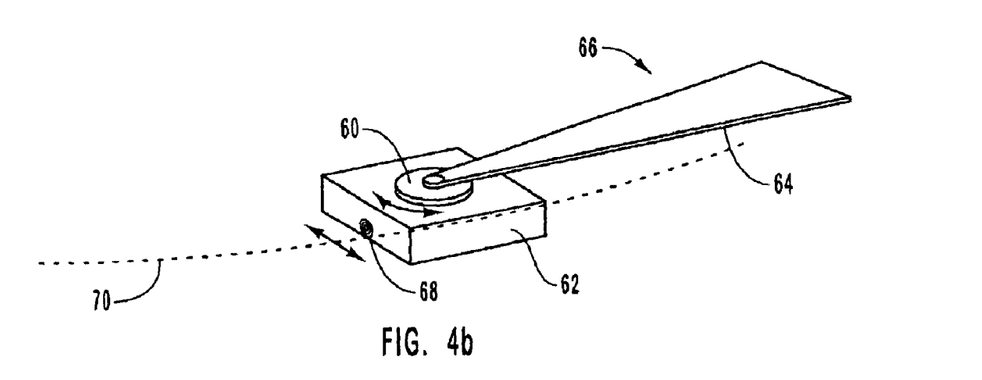
FIG. 4b depicts a small-scale actuator that rotates the recording head about the end of the arm of a head gimble assembly.
Figure 4C:
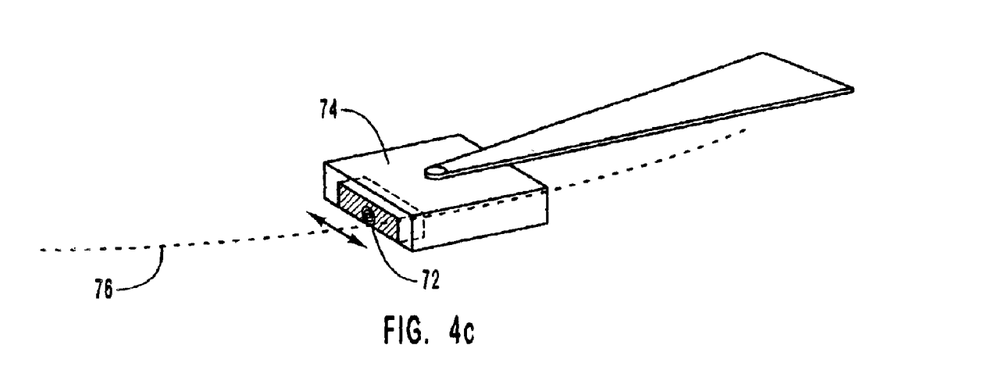
FIG. 4c illustrates a small-scale actuator that is integrated into the slider of a recording head and moves the transducer with respect to the remainder of the slider.

Any of a variety of small-scale actuators can be used with the invention, examples of which are illustrated in FIGS. 4a–c. As used herein, the terms "small-scale actuator" and "microactuator" are substantially interchangeable. FIG. 4a illustrates a microactuator 40, which is a small-scale actuator integrated into the arm 42 of a head gimble assembly 44 between the macroactuator and the transducer 46. Microactuator 40 can also be referred to as a "milliactuator", since the motion that is generated is on a scale that is intermediate with respect to the larger scale motion generated by the macroactuator and the smaller-scale motion that is generated by the small-scale actuators described below with respect to FIGS. 4b and 4c that move only the recording head or just the transducer. The microactuator 40 is capable of moving the end portion of the arm 42 and the attached recording head 48 in a direction that is substantially perpendicular to the orientation of the data tracks 50. Microactuator 40 may be constructed using a piezoelectrical device or another device that is capable of controlling movement of the recording head 48.

FIG. 4b depicts a microactuator 60, which is another example of the small-scale actuators that can be used according to the invention. Microactuator 60 induces rotational motion of the recording head 62 with respect to the arm 64 of the head gimble assembly 66. This rotational motion also results in motion of the transducer 68 in a direction that is substantially perpendicular to the orientation of the data tracks 70. FIG. 4c illustrates a recording head that has an integrated microactuator positioned between the transducer 72 and the remainder of the recording head 74. By moving with respect to the recording head 74, transducer 72 also can move in a direction that is substantially perpendicular to the orientation of the data tracks 76. All of the foregoing small-scale actuators operate in addition to the motion generated by the macroactuators, which produce motion of the entire head gimble assemblies. These examples of small-scale actuators are not limiting of the invention, which can be practiced in combination with any of a variety of other small-scale actuators positioned between the macroactuator and the transducer.

The small-scale actuators 40 and 60 of FIGS. 4a and 4b, respectively, are similar to existing small-scale actuators that are used in recently developed conventional disk drives.

These analogous existing small-scale actuators have been used to adjust the position of transducers over data tracks in disk drives that use only a single recording head at a time to perform read or write operations. Those of skill in the art, upon learning of the invention disclosed herein, will understand how to adapt existing small-scale actuators for use with the invention. The microactuator of FIG. 4c is a novel small-scale actuator that is similar to the micropositioners disclosed in U.S. patent application Ser. No. 10/342,920, entitled "Integrated Recording Head Micropositioner for Magnetic Storage Devices," which has been filed on the same day as the present application and is incorporated herein by reference.

2. Parallel Read and Write Operations for Improved Sustained Data Rates

The microactuator operates on a portion of the head gimble assembly that has less mass or a lower moment of inertia than the entire assembly that is moved by the macroactuator. Thus, because the microactuator moves less than the entire head gimble assembly, the microactuator is capable of positioning the transducer with greater accuracy and precision than the macroactuator. The use of microactuation allows the disk drive actuation systems of the invention to position each recording head independently to a certain extent. By placing the microactuators at a near-center position during the initial servo writing process, the microactuators can thereafter provide additional off-track motion in the range up to about one micron in either direction from the center position, depending on the nature of the microactuator, in addition to the motion produced by the macroactuators. Typical track pitches are about 0.3 microns or smaller in existing high-performance disk drives and are expected to continue to decrease in size. The motion produced by the microactuators can therefore be used to independently position each head during operation and to cause each head to stay on the desired track, within a limited range of about 5 to 10 tracks, again depending on the nature of the microactuator and the track pitch.

Figure 5A:
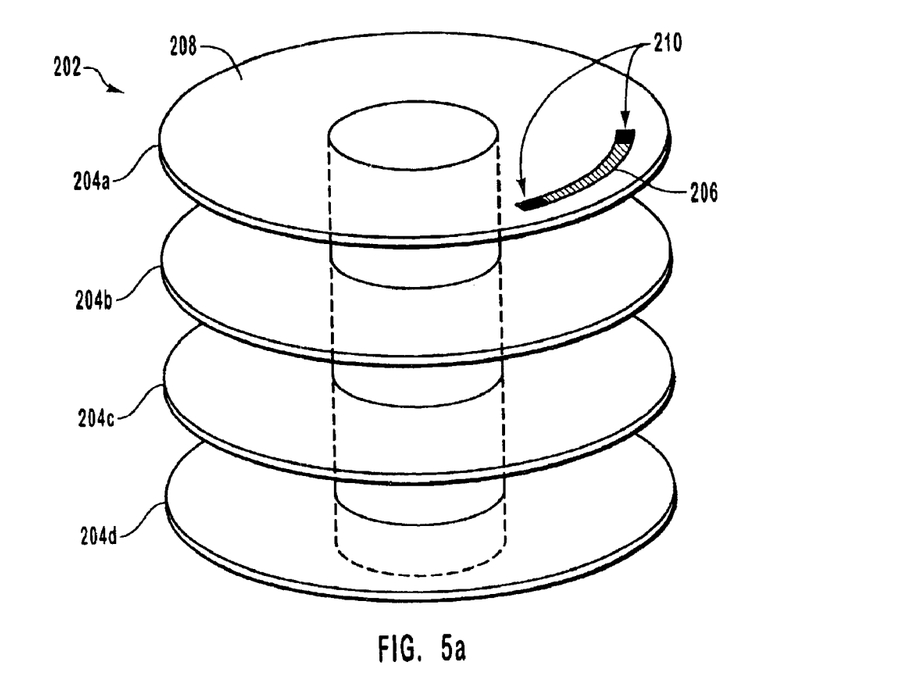
FIG. 5a shows a disk stack that is used to write a data block to the surface of a single disk using a conventional write process that uses one recording head at a time.
Figure 5B:
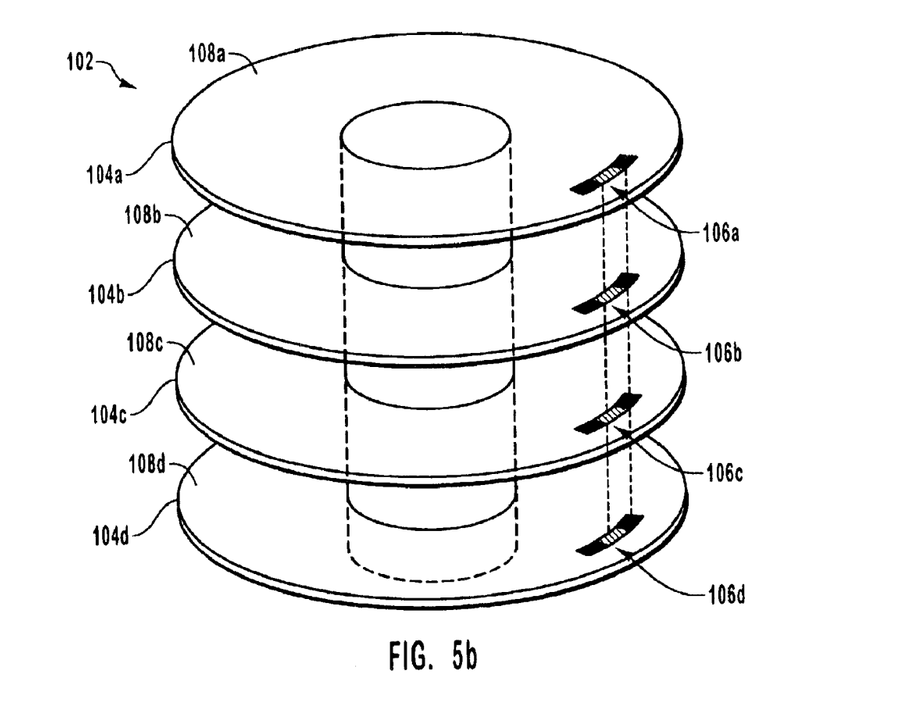
FIG. 5b illustrates an example of a parallel write operation in which a set of related data blocks are written to multiple surfaces of disks in a disk stack according to one embodiment of the invention.

The microactuators can be used in this manner to perform parallel read and write operations in a disk drive having a stacked disk architecture, such as the disk stack 102 illustrated in FIG. 5b. FIG. 5a illustrates a similar disk stack 202 that is used in a conventional process of writing data to a surface of a single disk 204a in a write operation that uses one recording head at a time. As shown in FIG. 5a, a data block is written to a region or sector 206 of surface 208 of disk 204a that typically has a size of 512 bytes. The sector 206 is defined by gray codes 210 with the embedded servo wedges at either end of the sector, as well as by header information that identifies the data sector. As described above, conventional disk drives are capable of writing or reading data using only a single recording head at a time. In order to take advantage of the other disks 204b–d in the disk stack 202, the read or write operation performed on disk 204a is terminated, and the macroactuator repositions another recording head associated with another disk (e.g., disk 204b) before the read or write operation is performed on the next disk.

The disk stack 102 of FIG. 5b is similar to the disk stack 202 of FIG. 5a. However, disk stack 102 is used in combination with a set of recording heads that are controlled using small-scale actuators, such as those illustrated in FIGS. 4a–c, as well as a macroactuator that moves the entire head gimble assembly. A parallel write, or "stacked write" operation is performed by breaking down the data blocks and writing the resulting set of related data blocks in parallel to the surfaces 108a–d of disks 104a–d, respectively. Each of the related data blocks can have, for example, a size of 128 to 512 bytes.

As shown in FIG. 5b, the regions or sectors 106a–d on the respective disks 104a–d are aligned in a single cylinder that spans the disks. The recording heads used with disks 104a–d are generally misaligned with each other or with respect to the data tracks in the cylinder on the order of a few tracks. In operation, the macroactuator positions all of the recording heads near the corresponding data tracks in the cylinder of the disk drive. In this context, "near" refers to being close enough to be within the range of motion of the small-scale actuators so that the small scale actuators can move the recording heads to be in a position that is operationally over the desired data tracks without requiring additional motion of the macroactuator. As used herein, being "over" a data track refers to the recording head being in a position to read or write with respect to the data track, regardless of the orientation of the disk drive or the frame of reference. The small-scale actuators, or microactuators, associated with each recording head servo over the surfaces of the disks 104a–d during the write operation and reposition the recording heads as necessary to position the recording heads over the specified sectors 106a–d to which the data blocks are to be written. In general, the closed-loop feedback process is described herein as using "servo information" embedded in the disks, regardless of the details of the servo process or the manner in which the servo writing has been performed.

Read operations are performed in parallel in a similar manner using the disk drive of FIG. 5b. The small-scale actuators are used to position the recording heads over the appropriate sectors 106a–d of disks 104a–d to enable the disk drive to access and read the entire data block that is distributed over the surfaces of the multiple disks. The number of disks 104 in the disk stack 102 is arbitrary, and can include as many as ten or more disks and twenty or more recording heads. The increased sustained data rates are essentially a multiple n of the sustained data rates that could be achieved using only a single recording head at a time, where n is the number of recording heads. Thus, the sustained data rates can be increased, up to a certain practical limit relating to power consumption and mechanical complexity, by increasing the number of recording heads and disks. Thus, the sustained data rates can be increased by as much as 20 times or more compared to the sustained data rates associated with conventional high-performance disk drives. These data rates are associated with, for example, disk packs having ten disks and twenty recording heads, and can be constructed within conventional form factors. A sustained data rate that is 20 times greater than conventional sustained data rates are compatible with the next generation of Fibre Channel and 10 Gigabit Ethernet optical networks.

While the parallel write operations can be used to improve sustained data rates, the parallel write operations can also be used in another embodiment of the invention to write parity information within a disk drive or, alternatively, to mirror the data of one disk to other disks in the same disk drive. Parity information can be written based on individual bytes, blocks, or frames of data. For spreading the data across platters within a disk drive, byte parity is efficient and works well for small bits of synchronized data. Also, this method reduces retries, which are based on picking up bad or unreadable information as measured by on-disk parity routines. Retries can be reduced as the disk parity writes can be used to correct errors in the read data, without retries that involve waiting for the disk to rotate the data back to the recording head. For drive-drive redundancy, single surface parity is not sufficient, as when a drive crashes, often more than one surface is lost. Hence, full mirroring on two independent drives is required for full data redundancy at the systems level.

Figure 6:
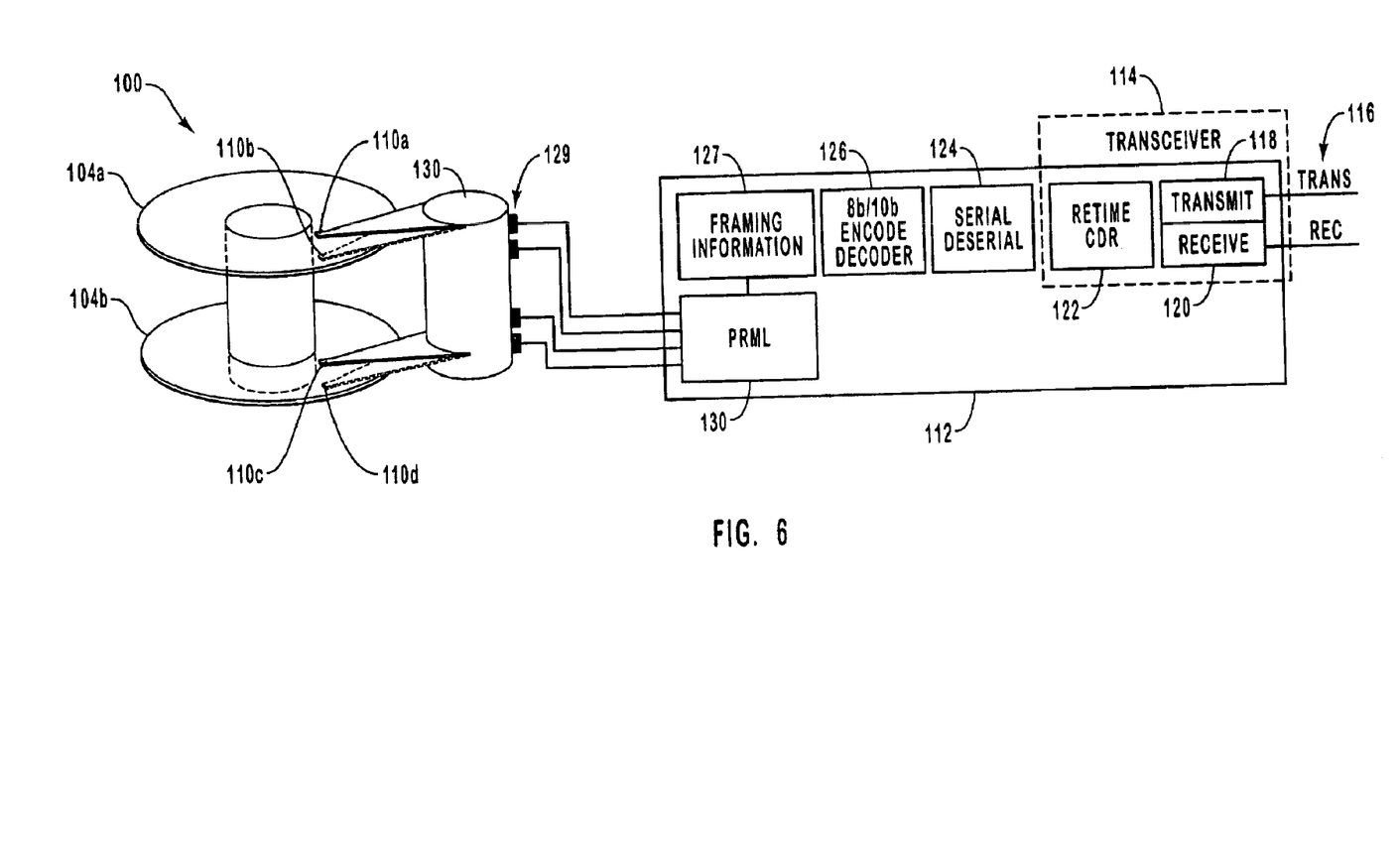
FIG. 6 is a schematic diagram illustrating the architecture of a disk drive that includes a four head, two disk stack and an integrated optical transceiver for performing parallel read and write operations according to the invention.

FIG. 6 illustrates a disk drive 100 having a stack of two disks 104a and 104b and four recording heads 110a–d, with one recording head on each surface of the disks. FIG. 6 illustrates the use of a disk drive 100 capable of parallel read and write operations that is used in combination with an integrated optical transceiver to achieve data rates that are compatible with high speed optical data networks. Disk drive 100 includes portions of an on-board host bus adapter (HBA) 112 that includes a transceiver 114, which in this case is an optical transceiver that converts data between optical and electrical carrier signals. Optical transceiver 114 is connected to a duplex optical fiber 116 that transmits and receives signals from a host controller, switch, or another device with which the disk drive 100 communicates. Optical transceivers that can be incorporated into the disk drives of the invention are well known in the art. A typical optical transceiver 114 includes a transmitter optical sub-assembly 118, a receiver optical sub-assembly 120, a retimer and clock and data recovery module 122, as well as other components that permit the optical transceiver to convert electrical signals to optical signals and vice versa.

Although the disk drives of the invention can be used with substantially any optical network, including those having different protocols and data transmission rates, transceiver 114 can be, for example, compatible with a 2.125 Gb/s Fibre Channel signal. Other examples of optical or electrical signals that can be used with the invention are serial SCSI, Gigabit Ethernet, serial ATA, or other existing protocols or those that may be developed in the future. The received optical or electrical signal that contains the data that is to be written to the disks 104a and 104b of disk drive 100 is received by the optical transceiver 114, which results in a serial electrical data signal being output by the optical transceiver. The disk drive 100 also includes a first serializer/deserializer (SERDES) module 124 that receives the serial data and deserializes the data into a string of bits that are to be transmitted to the disks 104a and 104b. The data can then be processed by a second SERDES 126 that includes, for example, a coding device 128 that performs a peak detect, a partial-response, maximum likelihood (PRML), or other encoding scheme optimized for encoding magnetically recorded digital signals. The coding device 128 is capable of receiving an 8b/10b based communication channel code (e.g., Ethernet, Fibre Channel) at 1 to 10 Gb/s and outputting a PRML or other recording code in multiple streams that have data rates less than the input rate. Although the HBA 112 is illustrated in FIG. 6 as being wholly integrated into the disk drive 100, some or all of the components included in HBA 112, such as the transceiver 114, can be external to the disk drive.

In addition to the data blocks contained in the data, the data also includes header information, which is processed by framing module 127. Disk drive 100 also includes read/write preamplifiers 129. The data is written simultaneously to the four surfaces of disks 104a and 104b using the four recording heads 110a–d. During the write process, feedback algorithms are used to control the positions of the microactuators and the macroactuator. The macroactuator control is based on either minimizing the sum of the two extremely located microactuators or the average of all of the microactuator positions by detecting the voltages of the microactuators. The microactuators are then positioned using a local position error signal (PES) computed from the embedded servo wedges located at one-half off-track positions. These control routines result in the macroactuator positioning the recording heads at an optimum center position. At the same time, the small-scale actuators are used to adjust the position of the transducers of the recording heads 110a–d as necessary with respect to the desired data tracks, which compensates for positional inaccuracies arising from various mechanical conditions, as has been explained above. The operation of reading the data that has been written to the disks 104a and 104b is essentially the inverse of the write operation described above. The read operation can be performed using an error correction code module 130 that operates on the parallel data streams generated by each recording head 110a–d prior to the serialization operation.

Figure 7:
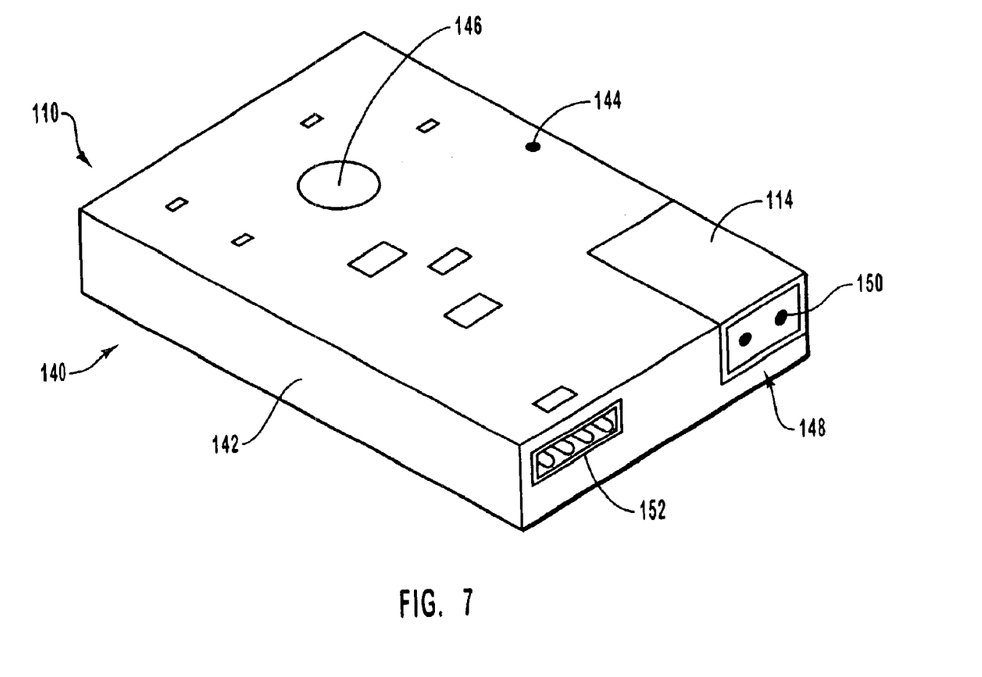
FIG. 7 is a perspective view of the disk drive of FIG. 6.

FIG. 7 is a perspective view of a the disk drive 100 described above in reference to FIG. 6. Disk drive 100 is enclosed in a housing 140 that includes a head-disk enclosure 142 and a printed circuit board 144 that secures the transceiver 114 and the processing component illustrated in FIG. 6. Printed circuit board 144 has a cutout 146 for the spindle motor that rotates the disks. Head-disk enclosure 142 has a cutout 148 adapted to provide access to ports 150 associated with the integrated transceiver 114. Disk drive 100 also has a power supply connector 152.

The parallel read and write operations also can be used with other novel storage devices. For instance, for intensive computing operations requiring a large amount of I/O beyond a reasonable DRAM size, one can integrate a 10 Gb/s sustained data rate storage unit directly or near a micro-processor running highly parallel computations. The drive can serve effectively as an extended RAM of the main processor, given the data availability of such a high speed storage device.

In another embodiment, integration of the transceiver and disk drive together in a network architecture, and building the RAID system fully within the drive (disk striping), allows one to fully eliminate the system architectures that exist today for network drives. The drives can be directly connected into the switch fabric, and perform as a direct attach device with there own MAC and IP address. This is a much more efficient storage system (given the disks are naturally synchronized and the performance is built in at the most fundamental hardware level) and removes all RAID requirements outside of the drive, greatly simplifying the software at the host bus and switch levels.

3. Writing Multiple Copies of Data Blocks to Improve Access Times

The foregoing disk drives that can be used for parallel read operations work well for large, associated blocks of data. The basic parallel read operations disclosed above generally do not increase performance to the same extent when the disk drives are used for random block processing, in which many small, random requests are made to a disk drive. In this case, the access time latencies are often sufficiently large to counteract the improved sustained data rates. The access time required to access data in a read operation is defined as the time between the read request and the time at which the requested data is under the recording head. The access time includes the seek time associated with moving the recording head radially to the specified data track and the rotation time associated with waiting for the desired segment of the data track to rotate to the recording head. The access time for existing high-performance 15,000 rpm drives can be as long as 10 ms, which includes 6 ms of seek time and 4 ms of rotation time. Although the access times are somewhat random, depending on the position of the recording head and the angular position of the disk as a read operation is performed, the maximum and average access times associated with existing high-performance disk drives represent another limitation on the speed at which data can be obtained.

Figures 8A, 8B, 8C, 8D:
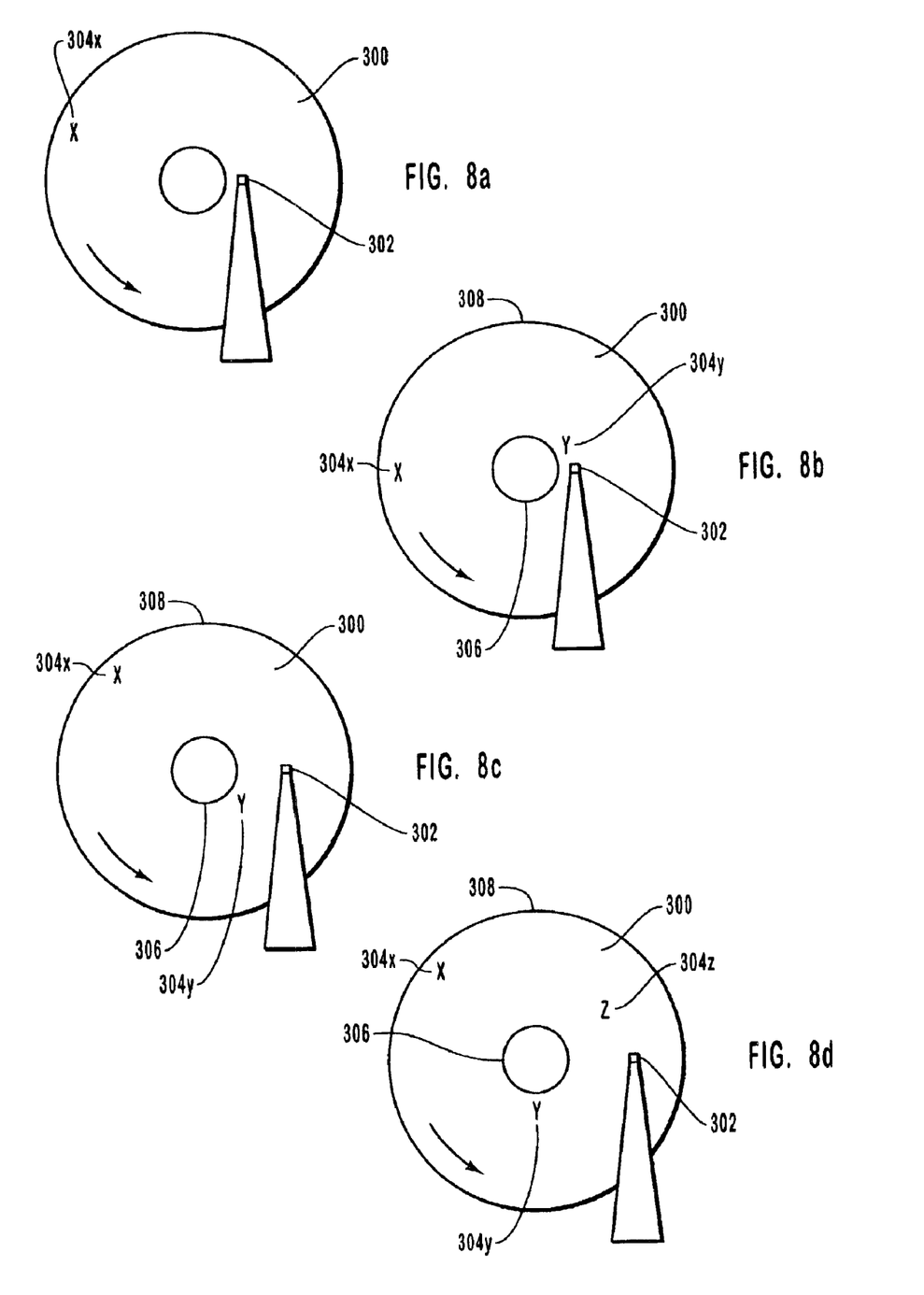
FIGS. 8a–d illustrate an example of a method for writing blocks of data in multiple locations on a disk to improve access times according to one embodiment of the invention.

A low cost approach for reducing access times is to write the same data blocks in multiple locations in a disk stack. This technique can be used in addition to the parallel read and write operations disclosed herein. As an example, FIGS. 8a–d show this method of improving access time, and contrast representative access times that can be achieved using one, two, and three copies of the same data block on the same surface of a single disk. Assuming that the disk drive operates at 15,000 rpm and that a seek time of 6 ms is required to move the recording head 302 radially from the inside diameter (ID) to the outside diameter (OD) of the disk 300, the worst case read access time for a single copy 304x of the data block is 10 ms, which includes the 6 ms of seek time and 4 ms of rotation time, as shown in FIG. 8a. The worst case access time for this and the other examples occurs when the recording head 302 has been brought to the desired data track just after the starting point of the desired segment in the data track has moved beyond the position of the recording head.

FIGS. 8b and 8c illustrate disk 300 that has had two copies 304x and 304y of the same data block written to different locations of the surface of the disk. By strategically positioning the two copies 304x and 304y of the data block at different locations, the maximum access time can be reduced to about one-half to one-third the maximum access time for one copy. Strategic positioning of the multiple copies can be performed using statistical analysis on the location of the regions for the data blocks so as to reduce or minimize the access times required for reading the data blocks. The worst case access time in the two-copy scenario is experienced when the copies 304x and 304y have been written at or near the inside diameter 306 and the outside diameter 308, since these positions result in the possibility of the recording head 302 being at the maximum distance from the nearest copy when a read request is received. As shown in FIG. 8b, if the recording head 302 is at the ID track 306 (or, equivalently, the outside diameter track 308) when the read request is received, the worst case access time is 4 ms (all rotation time), which occurs when the start of the sector containing the data block has just passed the recording head at the time of receipt of the read request.

In contrast, if the recording head 302 is positioned midway between the inside diameter 306 and outside diameter 308 at the time of the receipt of the read request as shown in FIG. 8c, the maximum access time involves the seek time and the rotation time. In particular, this access time includes about 3.4 ms of seek time to move the recording head 302 from the middle diameter (MD) track to either the ID track 306 or the OD track 308. The maximum access time also includes the rotation time experienced after moving the recording head 302 to the desired track. Because either of the two copies can be selected, the recording head 302 can generally be moved to a data track that will require no more than about 2 ms or rotation time, or one-half of a full rotation. The maximum access time in the two-copy case is thus associated with the scenario illustrated in FIG. 8c, which is roughly 5.4 ms. This is a worst case access time, and the average access time is substantially faster. In operation, the recording head is moved to the copy of the data block that will result in the smallest access time using an algorithm that is based on the current position of the recording head and the copies of the data blocks, and the nominal speed of the recording head and the rotational speed of the disk.

The copies of the data blocks can be distributed on one or more surfaces to minimize the access times required to read the data blocks. Although a variety of algorithms and optimizations can be employed, one example involves writing dual copies of same data blocks to two disk surfaces, starting with the OD/MD track and MD/ID track combinations on the two disk surfaces, and proceeding inward thereafter. This allows the disks to be filled without undue fragmentation.

Further gains in the maximum access time can be achieved by strategically placing three copies 304x–z of the same data block on the surface of the disk 300 as shown in FIG. 8d. At 15,000 rpm, an average access time (as opposed to the worst case access time) of less than 2 ms can be achieved with a data storage capacity reduction of the disk 300 of one third. In general, the percentage improvement in access time performance is roughly equivalent to the loss in data storage capacity of the disk, as successive additional copies of data blocks are written to the disk, up to about four copies.

Although the write data rate is reduced using this method, caching techniques can be used with the write operations so that, from the standpoint of the computer or information device that operates with the disk drive, the peak data rate for write operations is not significantly reduced For example, during the real-time response to a write request, only one (or none) of the multiple copies are written to the disk. Instead of writing all of the copies immediately, the data can be stored in a buffer and then the multiple copies are written to the selected locations on the disk during periods of inactivity or as disk defragmentation routines are performed. In this case, the locations where the multiple copies are to be stored in order to strategically position them on the surface of the disk are stored in records that are accessible to the disk drive. In addition, to the extent that the methods for writing multiple copies of the same data block are practiced in combination with the parallel write operations using small-scale actuators, the reduction in the sustained data rates for write operations is also not significant.

The location of the sectors to which the multiple copies of the data blocks are to be written and the number of the copies can be defined or selected based on the type of data being written. For example, data that is accessed frequently, such as application data, can be written in a relatively large number of locations on the disk, whereas archived data or other data that is read only infrequently can be written just once or a relatively small number of times. The number of copies of data blocks can also be selected based on the current or historical utilization of the capacity of the disk drive. For instance, if the capacity of the disk drive is underutilized, the disk drive can take advantage of the available storage space by writing more copies of the data blocks. Likewise, as the amount of data stored on the disk drive approaches the capacity thereof, the number of multiple copies can be reduced. Moreover, as the amount of stored data increases, the disk drive can free up space on the disks by designating that extra copies of infrequently accessed data blocks can be overwritten, if necessary. By proper positioning of the multiple copies of the data blocks and by reducing the settling times using the microactuators of the invention, latency and seek times can both be reduced by essentially as much as needed, while making a tradeoff that involves reduced data storage capacity.

The methods for writing multiple copies of the same data block to different locations for improved access times can be practiced with or without the parallel read and write operations disclosed herein. In addition, the methods for writing multiple copies can be implemented in disk drives having a single disk, in drives having a disk stack, in an array of disks, or in any other system that includes disk drives. The multiple copies of the same data block can be written to the same surface of a particular disk, different surfaces of the same disk or, when multiple disks are available, to surfaces of different disks. If the multiple copies are written to different surfaces of disks in a single disk drive, the multiple copies can also have a redundancy or backup purpose, and can be used in the event of the failure of one of the surfaces within the disk drive.

The methods of writing multiple copies of the same data block for improved access times are particularly applicable to portable and personal systems, in which either reduced power consumption or acoustics are critical. Parallel write and read operations at multiple locations are in general more efficient for power consumption than the increased spin speeds of the actuator, depending on the duty cycles required by the user. Acoustical noise can be significantly reduced by using a relatively low spin speed with parallel write and read operations using multiple copies of data blocks.

One advantage of multiple drive arrays and mirroring is the enhanced reliability. Most high-end drives now are capable of a significant amount of self-monitoring using, for instance, bit error rate trending, write current tracking, etc. With large arrays, users can now easily hot-swap a poor performing drive without impacting the system. By using fewer, parallel drives, such as those described herein, more data can be contained on each drive, and overall redundancy may reduced without sacrificing performance or the reliability of the system. The disk drives disclosed herein can be used in a system that implements any of different RAID level architectures within one disk drive. These RAID levels can be, for example, RAID 3 (byte-level parity with one parity surface), RAID 4 (block-level parity with one parity surface) and RAID 5 (parity shared among disks). Using this embodiment of the invention, the writing of multiple copies of data blocks for improved access time performance is done within single disk drive units, and only the redundancy is accomplished at the system level between discrete disk drive units.

Although the disk drives disclosed herein provide significant advantages compared to conventional systems, there are some tradeoffs that are typically required in order to achieve these advantages. For instance, the head-write process requires approximately 50–70 mA of direct current, in addition to the microactuation and macroactuation currents and the spindle motor and electronics. In addition, cross-talk between heads running in parallel can require the preamplifier to be moved closer to the recording head compared to conventional disk drives.

In addition to the cost of the microactuators, another cost associated with the disk drives of the invention relates to the individual control units for the microactuation (vs. muxed), and the multiple preamplifiers and channels. However, the increased cost of the preamplifiers is partially offset by the ability to place the preamplifiers much closer to the recording head, allowing for better performance by reducing the lead lengths. Moreover, lower cost servo writers can offset the costs associated with the multiple components in the disk drives of the invention. In general, these cost considerations are relatively small compared to the gains in data rate and access time that can be achieved according to the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A disk drive that is capable of performing multiple simultaneous read or write operations, comprising:
   at least one disk; and
   a head gimble assembly, including:
      at least two recording heads, each including a slider and being positioned at an end of an arm to operate with a different surface of the at least one disk;
      a macroactuator that is capable of moving the arms and the at least two recording heads; and
      a plurality of microactuators, each corresponding to one of the at least two recording heads and being positioned between the macroactuator and a transducer of the corresponding recording head, and wherein each microactuator is integrated in the corresponding recording head so as to permit motion of the transducer independent of the slider of the corresponding recording head.

2. The disk drive of claim 1, wherein the at least one disk comprises a plurality of disks.

3. The disk drive of claim 2, wherein each of the at least two recording heads is positioned to operate with surfaces of different disks of the plurality of disks.

4. The disk drive of claim 1, wherein each of the at least two recording heads is positioned to operate with a different surface of one disk.

5. The disk drive of claim 1, wherein the at least two recording heads are misaligned with one another, such that the at least two recording heads are incapable of being simultaneously operationally positioned over corresponding data tracks in a cylinder of the disk drive without at least one of the recording heads being positioned using the microactuators.

6. The disk drive of claim 1, wherein each microactuator is integrated in the arm associated with the corresponding recording head so as to permit motion of a portion of the arm and the recording head.

7. The disk drive of claim 1, wherein each microactuator is positioned between the corresponding recording head and the arm associated with the corresponding recording head so at to permit motion of the recording head with respect to the arm.

8. The disk drive of claim 1, wherein the sustained data rate of the disk drive is at least about four times greater than the sustained data rate that could be achieved using only a single recording head at a time to perform read or write operations.

9. The disk drive of claim 1, wherein the sustained data rate of the disk drive is at least about twenty times greater than the sustained data rate that could be achieved using only a single recording head at a time to perform read or write operations.

10. The disk drive of claim 1, further comprising a serializer/deserializer module for:
    segmenting serialized data that is to be written to the at least one disk by the at least two recording heads; and
    serializing data streams that have been read from the at least one disk by the at least two recording heads.

11. In a disk drive that includes at least one disk and at least two recording heads, a method for performing a parallel I/O operation using the at least two recording heads, comprising the acts of:
    in response to a request for the I/O operation, positioning all of the at least two recording heads near data tracks that are included in a cylinder of the disk drive using a macroactuator;

repositioning at least one of the recording heads using a microactuator that is integrated between the macroactuator and a transducer so as to permit motion of the transducer with respect to a slider associated with said at least one of the recording heads, so that all of the at least two recording heads, including said at least one of the recording heads, are operationally positioned over corresponding data tracks in the cylinder; and performing the parallel I/O operation using all of the at least two recording heads.

12. The method of claim 11, wherein the at least two recording heads are misaligned with one another, such that the at least two recording heads are incapable of being simultaneously operationally positioned over corresponding data tracks in the cylinder of the disk drive without at least one of the recording heads being repositioned using the microactuator.

13. The method of claim 11, wherein:
the I/O operation is a write operation; and
the act of performing the parallel I/O operation comprises the acts of:
dividing a data block that is to be written into a set of related data blocks; and
writing the related data blocks to the data tracks in the cylinder using the corresponding recording heads.

14. The method of claim 11, wherein the act of repositioning at least one of the recording heads is performed in response to detecting servo information embedded in the surface of the disk that corresponds to said at least one of the recording heads.

15. The method of claim 14, further comprising the acts of:
during the parallel I/O operation, receiving a position error signal from each disk surface;
in response to the position error signal, using the microactuators to individually reposition the recording heads to minimize the error defined by the corresponding position error signal; and
using the macroactuator to reposition the recording heads together to minimize the summation of either the two extreme microactuator positions or the average of all of the microactuator positions.

16. The method of claim 11, wherein the act of performing the parallel I/O operation comprises the act of writing parity information using one of the at least two recording heads, the parity information relating to data being written by others of the at least two recording head.

17. The method of claim 11, wherein the act of performing the parallel I/O operation comprises the act of writing multiple copies of the same data blocks using, the at least two recording heads to obtain a mirrored copy of the data blocks on different surfaces of said at least one disk.

18. In a disk drive that includes at least one disk and a recording head, a method for improving access time required to respond to a read request, comprising the acts of:
writing multiple copies of a first data block to different regions of the at least one disk;
in response to the read request, moving the recording head over one of the multiple copies that has been selected to produce an access time that is lower than an access time that would be associated with moving the recording head over another of the multiple copies; and
reading said selected one of the multiple copies.

19. The method of claim 18, wherein the act of writing multiple copies of the same data block comprises the acts of:
writing a first copy of the first data block to a first region of the at least one disk; and writing a second copy of the first data block to a second region of the at least one disk, therein the second region has been selected based on information identifying the position of the first region.

20. The method of claim 18, wherein multiple copies include at least three copies of the first data block.

21. The method of claim 18, wherein the act of writing multiple copies comprises the act of writing the multiple copies of the first data block to different regions of a single surface of one disk.

22. The method of claim 18, wherein the act of writing multiple copies comprises the acts of:
writing a first of the multiple copies to a first surface in the disk drive; and
writing a second of the multiple copies to a second surface in the disk drive.

23. The method of claim 22, further comprising the acts of:
experiencing data loss, including the loss of the first of the multiple copies; and
restoring the lost data by using the second of the multiple copies.

24. The method of claim 18, further comprising the act of writing only a single copy of a second data block to the at least one disk, the second data block having a data type that is designated as being accessed less frequently than a data type of the first data block.

25. The method of claim 18, further comprising the act of selecting the number of the multiple copies based on the amount of the data storage capacity of the disk drive that has been used.

26. The method of claim 18, further comprising the acts of:
as the disk drive operates, tracking the frequency of use of data blocks written to the at least one disk; and
as the amount of data stored on the disk drive approaches the data storage capacity of the disk drive, performing the acts of:
identifying data blocks that have been accessed less frequently than other data blocks; and
designating the identified data blocks to be overwritten.

27. The method of claim 18, wherein:
the act of writing multiple copies of the first data block is performed by writing the multiple copies of the first data block to a single surface of one disk using a first recording head; and
the act of writing multiple copies of the first data block is performed simultaneously with the act of writing other data to a disk of the disk drive using a second recording head.

28. The method of claim 27, wherein each of the first recording head and the second recording head operates with a different microactuator that is positioned between the corresponding first or second recording head and a macroactuator.

29. The method of claim 18, further comprising the act of using the disk drive in a device having specified acoustical requirements, wherein the disk drive has a rotational speed that is sufficiently low to comply with the acoustical requirements, and wherein the access time that is achieved by the disk drive could not be achieved while complying with the acoustical requirements if only single copies of the data blocks were to be used, based on the higher rotational speed that would thereby be required.

30. The method of claim 18, further comprising the act of using the disk drive in a device having specified power requirements, wherein the disk drive has a rotational speed that is sufficiently low to comply with the power requirements, and wherein the access time that is achieved by the disk drive could not be achieved while complying with the power requirements if only single copies of the data blocks were to be used, based on the higher rotational speed that would thereby be required.

31. The method of claim 18, wherein the act of writing the multiple copies comprises the acts of:
buffering information associated with a write request prior to writing all of the multiple copies of the first data block; and
after a delay and using the buffered information, completing the writing of the multiple copies of the first data block.

32. The method of claim 31, wherein the act of buffering the information associated with the write request comprises the act of storing information specifying the regions of the at least one disk to which the multiple copies of the first data block are to be written.

33. The method of claim 31, wherein the act of completing the writing of the multiple copies is performed during one of a period of inactivity of the disk drive or a disk defragmentation routine.

34. A disk drive that is capable of performing multiple simultaneous read or write operations at speeds that are compatible with an optical data network with which the disk drive operates, the disk drive comprising:
at least one disk;
at least two recording heads that are capable of being independently repositioned over corresponding data tracks in a single cylinder of the disk drive to enable the at least two recording heads to perform parallel read and write operations;
an optical transceiver integrated into the disk drive for enabling the disk drive to communicate with the optical data network.

35. The disk drive of claim 34, wherein the parallel read operations have a sustained data rate that is as great as the data transmission rate in the optical data network.

36. The disk drive of claim 35, wherein the data transmission rate in the optical network is at least as great as about 2.125 Gb/second.

37. The disk drive of claim 34, wherein the parallel write operations have a sustained data rate that is as great as the data transmission rate in the optical data network.

38. The disk drive of claim 34, further comprising a buffer that is used in combination with the parallel write operations to achieve a peak write data rate that is greater than the sustained write data rate.

39. The disk drive of claim 38, wherein the peak write data rate is as great as the data transmission rate in the optical data network.

40. The disk drive of claim 39, wherein the data transmission rate in the optical data network is at least as great as about 2.125 Gb/second.

41. The disk drive of claim 39, wherein the data transmission rate in the optical data network is at least as great as about 10 Gb/se 42. A disk drive that is capable of performing multiple simultaneous read or write operations at speeds that are compatible with an optical data network with which the disk drive operates, the disk drive comprising:
at least one disk:
at least two recording heads that are capable of being independently repositioned over corresponding data tracks in a single cylinder of the disk drive to enable the at least two recording heads to perform parallel read and write operations;
an optical transceiver integrated into the disk drive for enabling the disk drive to communicate with the optical data network
a head gimble assembly that includes:
said at least two recording heads, each being positioned at an end of an arm to operate with a different surface of the at least one disk;
a macroactuator that is capable of moving the arms and the at least two recording heads; and
a plurality of microactuators, each corresponding to one of the at least two recording heads and being positioned between the macroactuator and a transducer of the corresponding recording head.

43. The disk drive of claim 42, further comprising an encoder module that receives data that is to be written to the at least one disk by the at least two recording heads and outputs multiple data streams having data rates less than the data rate of the received data.

44. The disk drive of claim 43, wherein the encoder module is capable of receiving the data in an 8*b*/10*b* based communication channel at a data rate in the range between about 1 Gb/second and about 10 Gb/second.

45. The disk drive of claim 43, wherein the encoder module implements a PRML or another digital encoding algorithm optimized for magnetic storage.

* * * * *